(12) United States Patent
Joshi et al.

(10) Patent No.: US 11,358,074 B2
(45) Date of Patent: Jun. 14, 2022

(54) SPIN PLATE CYCLONIC FILTER

(71) Applicant: JAIN IRRIGATION SYSTEMS LIMITED, Maharashtra (IN)

(72) Inventors: Abhijit Bhaskar Joshi, Jalgaon (IN); Ajit Bhavarlal Jain, Jalgaon (IN); Kishor Lalchand Nemade, Jalgaon (IN)

(73) Assignee: JAIN IRRIGATION SYSTEMS LIMITED, Jalgaon (IN)

( * ) Notice: Subject to any disclaimer, the term of this patent is extended or adjusted under 35 U.S.C. 154(b) by 264 days.

(21) Appl. No.: 16/606,469

(22) PCT Filed: Apr. 18, 2018

(86) PCT No.: PCT/IN2018/050231
§ 371 (c)(1),
(2) Date: Oct. 18, 2019

(87) PCT Pub. No.: WO2018/193472
PCT Pub. Date: Oct. 25, 2018

(65) Prior Publication Data
US 2021/0331094 A1    Oct. 28, 2021

(30) Foreign Application Priority Data
Apr. 18, 2017    (IN) .............................. 201721013787

(51) Int. Cl.
*B01D 21/26*    (2006.01)

(52) U.S. Cl.
CPC ........ *B01D 21/267* (2013.01); *B01D 2221/00* (2013.01)

(58) Field of Classification Search
CPC .. B01D 21/26; B01D 21/267; B01D 2221/00; B01D 29/74; B04C 2003/006; C02F 1/38
See application file for complete search history.

(56) References Cited

U.S. PATENT DOCUMENTS

| | | | |
|---|---|---|---|
| 3,187,898 A * | 6/1965 | Baker | B01D 37/02 210/331 |
| 4,855,050 A | 8/1989 | Senyard, Sr. et al. | |
| 5,494,589 A | 2/1996 | Moorehead et al. | |
| 2010/0213118 A1 | 8/2010 | Tandon | |
| 2014/0299540 A1 * | 10/2014 | Ackermann | B04C 3/06 210/512.3 |
| 2016/0263589 A1 | 9/2016 | Corcoran et al. | |

OTHER PUBLICATIONS

International Search Report and Written Opinion issued in PCT/IN2018/050231; dated Sep. 24, 2018; ISA/US.

* cited by examiner

*Primary Examiner* — Bradley R Spies
*Assistant Examiner* — Jeannie McDermott
(74) *Attorney, Agent, or Firm* — Harness, Dickey & Pierce, P.L.C.

(57) ABSTRACT

A spin filter plate is disclosed. The spin filter may be mounted in any type of separator/filter system used in irrigation system. The spin filter plate enables to create a cyclonic flow of the fluid, independent of the angle the fluid is supplied to the filter system.

10 Claims, 3 Drawing Sheets

SPIN PLATE CYCLONIC FILTER

CROSS REFERENCE TO RELATED APPLICATIONS

This application is a U.S. National Phase Application under 35 U.S.C. 371 of International Application No. PCT/IN2018/050231 filed on Apr. 18, 2018, which claims the benefit of priority from Indian Patent Application No. 201721013787 filed on Apr. 18, 2017. The entire disclosures of all of the above applications are incorporated herein by reference.

TECHNICAL FIELD

The present disclosure described herein, generally relates to a separation apparatus, to separate a suspension of particles from liquid. More particularly, the present disclosure relates to a cyclone separator having improved separation capabilities over known cyclone separators.

BACKGROUND

Cyclonic filters are used for separating heavy suspended impurities from the irrigation water before being supplied. In the cyclonic separators, the fluid is forced into a cylindrical enclosure at a tangential angle and is made to flow in an outer circuitous path. The fluid flows from this outer circuitous path toward the interior where it is withdrawn through a central opening. Since the fluid migrates in a direction opposite the radial centrifugal forces in the whirling fluid, heavier elements are left to the outside while clean fluid passes to the interior and out of the Cyclone separator through a central upper opening. The denser suspended particles remain in the outer circumference of the whirling fluid and are passed downwardly and out of the cyclone filter through a lower opening.

The particle entrapping efficiency of cyclonic filter may be affected by the turbulence. The turbulent and cross current flows of solid particles which are travelling to the outer periphery may get pushed towards the central flow regime and pushed out, affecting the efficiency of the separator.

SUMMARY

This summary is provided to introduce concepts related to spin plate filter and the concepts are further described below in the detailed description. This summary is not intended to identify essential features of the claimed subject matter nor is it intended for use in determining or limiting the scope of the claimed subject matter.

In an implementation of the present disclosure a spin filter plate 100 is disclosed. The spin filter place may comprise an inner core surface 102. The inner core surface 102 may further comprise a circular ring 106 and an outer circular ring 108. Further, an outer peripheral surface 104 may enclose the inner core surface 102. The outer peripheral surface 104 may further comprise a vertical surface 112. And the vertical surface 112 further comprise a first end 116 and a second end 118. The spin filter place may further comprise a plurality of gradient surface 110 wherein the gradient surface 110 is sandwiched between the outer peripheral surface 104 and the inner core surface 102.

DETAILED DESCRIPTION

The present subject matter discloses a spin plate filter.

In an exemplary embodiment of the present disclosure a spin filter plate is disclosed. The spin filter may be mounted in any type of separator/filter system used in irrigation system. The spin filter plate enables to create a cyclonic flow of the fluid, independent of the angle the fluid is supplied to the filter system.

The spin filter plate as disclosed in the exemplary embodiment is further configured to reduce the turbulence during the creation of the cyclonic filter. The cyclonic filter is mounted within the filter/separator system such that when the fluid flowing in the filter system comes into contact with the spin filter plate the flow of the fluid is oriented into cyclonic motion thereby creating vortex. Due to the cyclonic motion of the fluid and the vortex, heavy suspended particles in the fluid are pushed at the periphery and are extracted from there. Since the spin filter plate reduces the turbulence the flow of the fluid is more laminar in cyclonic motion.

Figure 1A:
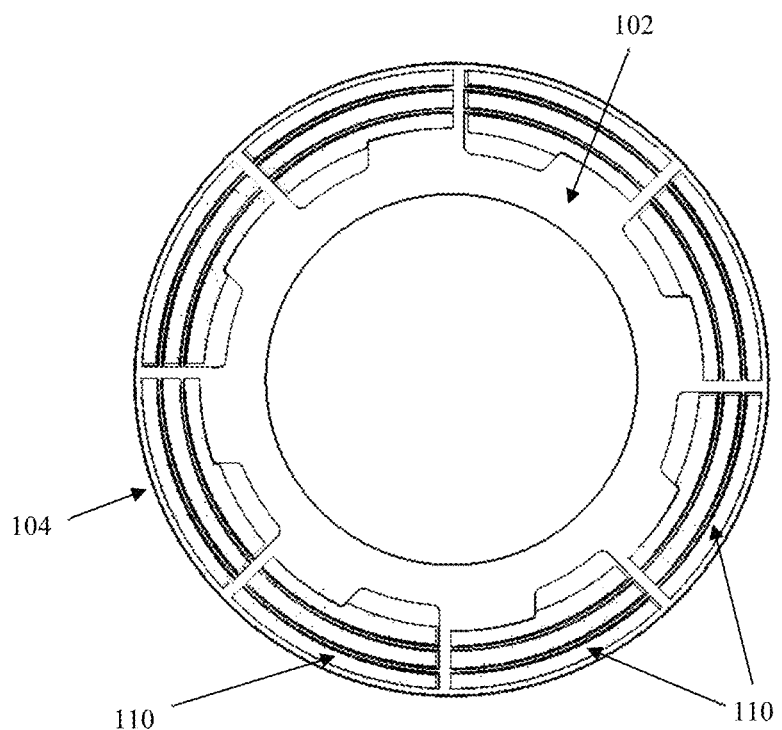
FIG. 1a illustrates a cyclonic spin filter plate, in accordance with the present disclosure.
Figure 1B:
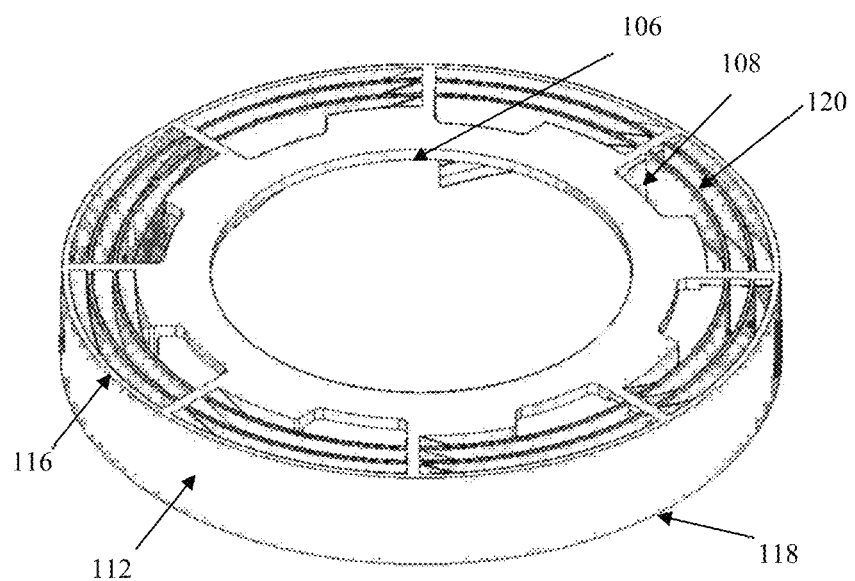
FIG. 1b illustrates a cyclonic spin filter plate, in accordance with the present disclosure.

FIG. 1a, FIG. 1b illustrates a cyclonic spin filter plate, in accordance with the present disclosure. The spin filter plate 100 comprises an inner core surface 102 and an outer peripheral surface 104. The inner core surface 102 may further comprise a circular ring 106 and an outer circular ring 108. The spin filter plate 100, may further comprise a plurality of gradient surface 110. The gradient surface 110 may be sandwiched between the outer peripheral surface 104 and the inner core surface 102. The outer peripheral surface 104 may further comprise a vertical surface 112, wherein the vertical surface 112 may further comprise a first end 116 and a second end 118. The first end 116 may be positioned such that it's the first end that comes into contact with fluid or fluid facing end. The second end 118 is at distal position from the first end 116. Further in accordance with the present embodiment the plurality of gradient surface 110 may have gradient between the first end 116 and the second end 118, such that the gradient slope is high at first end 116 and gradually reduces towards the second end 118. The gradient angle for the plurality of gradient surface 110 may vary between 20 degree to 45 degree. In another exemplary embodiment, each of the gradient surface 110, from the plurality of the gradient surface 110, may have different gradient angle with respect to each other.

The plurality of gradient surface 110 may further comprise a plurality of ribs 120 extending away from the gradient surface 110 in a perpendicular direction i.e. for e.g. from second end 118 towards first end 116. The plurality of ribs 120 may be parallel to the vertical surface 112 or each rib may be at a different angle with respect to the vertical surface 112. The plurality of ribs 120 and the plurality of gradient surface 110 provide cyclonic flow to the fluid along with directions and removing the turbulence from the fluid.

In another embodiment, the spin filter plate 100 may be comprise an integral locking mechanism so as to lock the plate in the filter system.

Figure 1C:
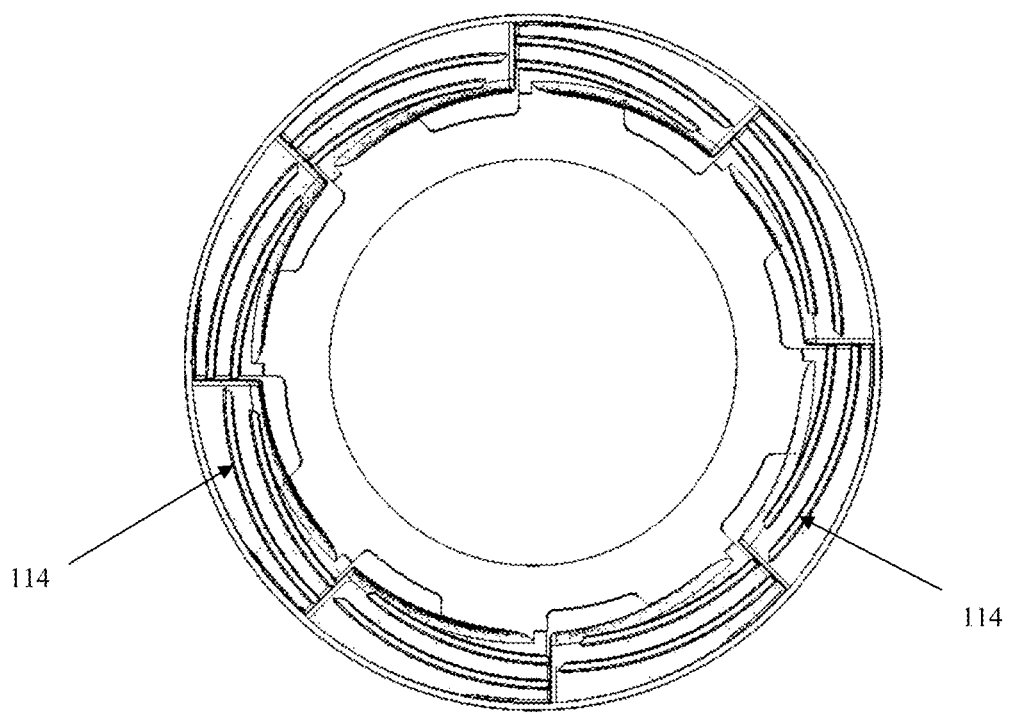
FIG. 1c illustrates a cyclonic spin filter plate, in accordance with another exemplary embodiment of the present disclosure.

FIG. 1c illustrates a cyclonic spin filter plate, in accordance with another exemplary embodiment of the present disclosure. The spin plate filter 100 as illustrated may further comprise a plurality of another ribs 114. The plurality of another ribs 114 may extend away from the gradient surface 110 in a perpendicular direction i.e. for e.g. from first end 116 towards second end 118. The plurality of another ribs 114 may be in opposite side to the plurality of ribs 120 on the gradient surface 110. In accordance with the present exemplary embodiment the spin plate filter may comprise both the plurality of ribs 120 and the plurality of another ribs 114 or either of them.

The plurality of another ribs 114 may be parallel to the vertical surface 112 or each rib may be at a different angle with respect to the vertical surface 112. The plurality of another ribs 114 and the plurality of gradient surface 110 provide cyclonic flow to the fluid along with directions and removing the turbulence from the fluid.

Figure 2:
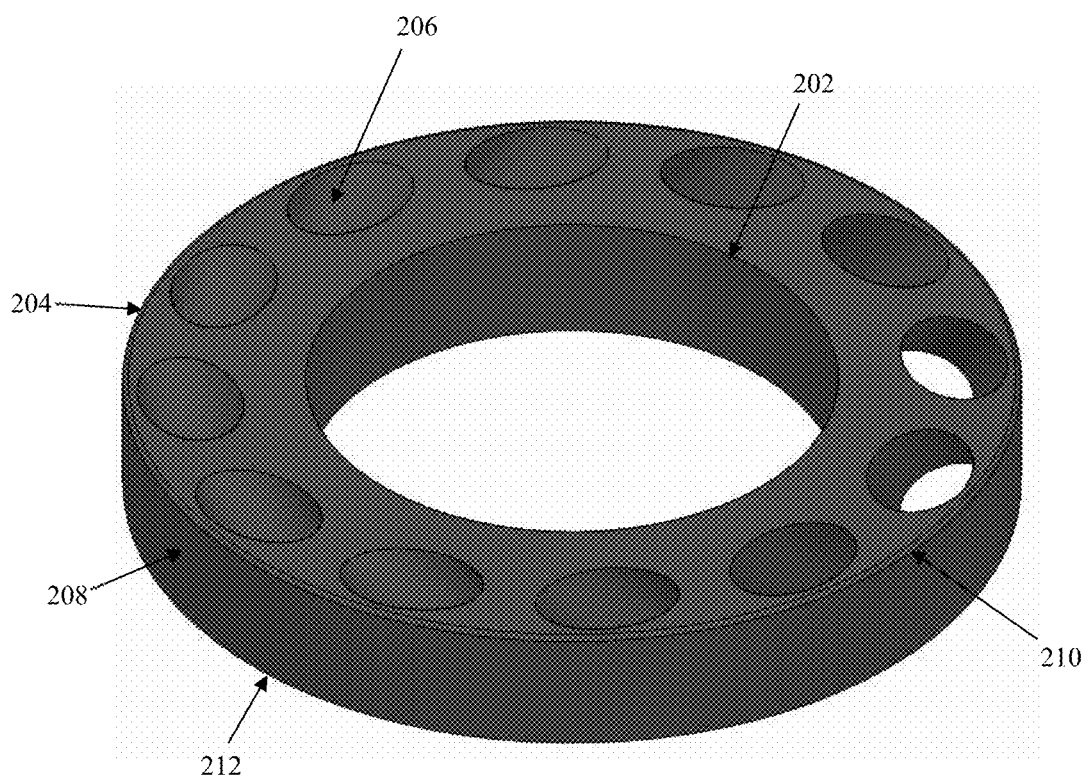
FIG. 2 illustrates a cyclonic spin filter plate, in accordance with another exemplary embodiment of the present disclosure.

FIG. 2, illustrates a cyclonic spin filter plate, in accordance with another exemplary embodiment of the present disclosure. The spin filter plate 200 comprises an inner circular ring 202 and an outer peripheral surface 204. The spin filter plate 200, may further comprise a plurality of gradient channels 206. The gradient channels 206 may be sandwiched between the outer peripheral surface 204 and the inner circular ring 202. The outer peripheral surface 204 may further comprise a vertical surface 208, wherein the vertical surface 208 may further comprise a first end 210 and a second end 212. The first end 210 may be positioned such that it's the first end that comes into contact with fluid or fluid facing end. The second end 212 is at distal position from the first end 210. Further in accordance with the present embodiment the plurality of gradient channels 206 may have gradient between the first end 210 and the second end 212, such that the gradient slope is high at first end 210 and gradually reduces towards the second end 212. The gradient angle for the plurality of gradient channels 206 may vary between 20 degree to 45 degree. In another exemplary embodiment, each of the gradient channels 206, from the plurality of the gradient surface 206, may have different gradient angle with respect to each other.

The plurality of gradient channels 206 may further comprise twist or have angle with respect to the horizontal or ground.

We claim:

1. A spin filter plate comprising:
    an inner core surface comprising, a circular ring and an outer circular ring;
    an outer peripheral surface enclosing the inner core surface, wherein the outer peripheral surface comprises a vertical surface having a first end and a second end;
    a plurality of gradient surfaces circumferentially placed and sandwiched between the outer peripheral surface and the inner core surface, and the plurality of gradient surfaces have a different gradient angle with respect to each other across the circumference, wherein each gradient surface has a gradient between the first end and the second end, such that the gradient slope is high at the first end and gradually reduces towards the second end; and
    a plurality of ribs circumferentially extending away from the plurality of gradient surfaces in a perpendicular direction between the outer circular ring and the outer peripheral surface.

2. The spin filter plate as claimed in claim 1, wherein the first end is positioned such that the first end first encounters fluid.

3. The spin filter plate as claimed in claim 1, wherein the second end is at a distal position from the first end.

4. The spin filter plate as claimed in claim 1, wherein a gradient angle for the plurality of gradient surfaces varies between 20 degrees to 45 degrees.

5. The spin filter plate as claimed in claim 1, wherein the plurality of ribs is parallel to the vertical surface.

6. The spin filter plate as claimed in claim 1, wherein each rib from the plurality of ribs is at a different angle with respect to the vertical surface.

7. The spin filter plate as claimed in claim 1, wherein the plurality of ribs and the plurality of gradient surfaces generate a cyclonic flow to the fluid along with directions and remove the turbulence from the fluid thereby creating vortex, when the fluid makes a contact with the spin filter plate.

8. The spin filter plate as claimed in claim 1, wherein the plurality of gradient surfaces are completely closed to form a plurality of gradient channels.

9. The spin filter plate as claimed in claim 1, wherein the spin filter plate is configured to be mounted within a filter system.

10. The spin filter plate as claimed in claim 1, wherein the spin filter plate generates a cyclonic flow of the fluid and vortex independent of the angle of the supplying fluid.

* * * * *